(12) United States Patent
Svalesen et al.

(10) Patent No.: US 8,466,792 B2
(45) Date of Patent: Jun. 18, 2013

(54) PORTABLE RADIO FREQUENCY IDENTIFICATION SYSTEM

(75) Inventors: Richard Keith Svalesen, Mesquite, TX (US); Dean L. Frew, McKinney, TX (US); Larry Hilgert, Flower Mound, TX (US)

(73) Assignee: Xterprise, Incorporated, Carrollton, TX (US)

( * ) Notice: Subject to any disclaimer, the term of this patent is extended or adjusted under 35 U.S.C. 154(b) by 732 days.

(21) Appl. No.: 12/606,820

(22) Filed: Oct. 27, 2009

(65) Prior Publication Data

US 2010/0102969 A1    Apr. 29, 2010

Related U.S. Application Data

(60) Provisional application No. 61/109,444, filed on Oct. 29, 2008.

(51) Int. Cl.
*G08B 13/14* (2006.01)
(52) U.S. Cl.
USPC .................. 340/572.8; 340/572.7; 235/383; 235/385
(58) Field of Classification Search
USPC ...... 340/572.8, 572.7, 572.1, 572.4; 235/383, 235/385, 487, 492, 375, 376, 435, 451
See application file for complete search history.

(56) References Cited

U.S. PATENT DOCUMENTS

| | | |
|---|---|---|
| 1,072,089 A | 9/1913 | Connelly |
| 1,342,236 A | 6/1920 | Szako |
| 1,554,656 A | 9/1925 | Pusey |
| 3,550,602 A | 12/1970 | Hesterman et al. |
| 4,048,980 A | 9/1977 | Googin et al. |
| 5,140,141 A | 8/1992 | Inagaki et al. |
| 5,556,064 A | 9/1996 | Cowe |
| 5,594,384 A | 1/1997 | Carroll et al. |
| 5,631,193 A | 5/1997 | Burns |
| 5,661,457 A | 8/1997 | Ghaffari et al. |
| 5,689,242 A | 11/1997 | Sims et al. |
| 5,910,770 A | 6/1999 | Ohara |
| 6,250,490 B1 | 6/2001 | Loftus |
| 6,307,517 B1 | 10/2001 | Lee |
| 6,377,176 B1 | 4/2002 | Lee |

(Continued)

OTHER PUBLICATIONS

"Technical Report: 860MHz-930MHz Class I Radio Frequency Identification Tag Radio Frequency & Logical Communication Interface Specification Candidate Recommendation," Version 1.0.1, Nov. 14, 2002, pp. 1-17, Auto-ID Center, Massachusetts Institute of Technology, Cambridge, MA.

(Continued)

*Primary Examiner* — Hung T. Nguyen
(74) *Attorney, Agent, or Firm* — Boisbrun Hofman, PLLC

(57) ABSTRACT

A radio frequency identification ("RFID") system and method of operating the same. In one embodiment, the RFID system includes a portable structure including a frame with a base supported by a plurality of wheels, an antenna tower and at least one removable shelf therein. The RFID system also includes an RFID reader located on the at least one removable shelf and at least one antenna mounted on the antenna tower and coupled to the RFID reader. The RFID system still further includes a computer system located on the at least one removable shelf and coupled to the RFID reader, and a power subsystem located on the at least one removable shelf and coupled to the RFID reader and the computer system.

20 Claims, 13 Drawing Sheets

U.S. PATENT DOCUMENTS

| | | | |
|---|---|---|---|
| 6,445,297 B1 | 9/2002 | Nicholson | |
| 6,712,276 B1 | 3/2004 | Abali et al. | |
| 6,758,482 B2 * | 7/2004 | Stallbaumer | 280/47.27 |
| 6,825,766 B2 | 11/2004 | Hewitt et al. | |
| 6,853,087 B2 | 2/2005 | Neuhaus et al. | |
| 6,897,827 B2 | 5/2005 | Senba et al. | |
| 6,937,153 B2 | 8/2005 | Redlin | |
| 6,943,678 B2 | 9/2005 | Muirhead | |
| 6,948,344 B2 | 9/2005 | Janssen et al. | |
| 6,954,145 B2 | 10/2005 | Nakamura et al. | |
| 6,973,416 B2 | 12/2005 | Denny et al. | |
| 7,088,249 B2 | 8/2006 | Senba et al. | |
| 7,114,655 B2 | 10/2006 | Chapman et al. | |
| 7,145,456 B2 | 12/2006 | Castle | |
| 7,151,455 B2 | 12/2006 | Lindsay et al. | |
| 7,161,489 B2 | 1/2007 | Sullivan et al. | |
| 7,205,898 B2 | 4/2007 | Dixon et al. | |
| 7,306,245 B1 * | 12/2007 | Lowe | 280/47.18 |
| 7,327,260 B2 | 2/2008 | Himberger et al. | |
| 7,336,153 B2 | 2/2008 | Malone et al. | |
| 7,342,496 B2 | 3/2008 | Muirhead | |
| 7,345,643 B2 | 3/2008 | Forster et al. | |
| 7,423,535 B2 | 9/2008 | Chung et al. | |
| 7,433,610 B2 | 10/2008 | Oyama | |
| 7,453,360 B2 | 11/2008 | Glaser | |
| 7,460,073 B2 | 12/2008 | Schillmeier et al. | |
| 7,527,198 B2 | 5/2009 | Salim et al. | |
| 7,557,715 B1 | 7/2009 | Noakes et al. | |
| 7,566,010 B2 | 7/2009 | Yamazaki et al. | |
| 7,570,165 B2 | 8/2009 | Abraham, Jr. et al. | |
| 7,589,636 B2 * | 9/2009 | Ayyagari et al. | 340/572.7 |
| 7,602,292 B2 | 10/2009 | Watanabe | |
| 7,616,117 B2 | 11/2009 | Streeb et al. | |
| 7,667,575 B2 | 2/2010 | Husak et al. | |
| 7,714,723 B2 * | 5/2010 | Fowler et al. | 340/572.1 |
| 7,844,505 B1 | 11/2010 | Arneson et al. | |
| 2001/0020896 A1 | 9/2001 | Higuchi | |
| 2003/0208744 A1 | 11/2003 | Amir et al. | |
| 2004/0094251 A1 | 5/2004 | Strache et al. | |
| 2004/0214665 A1 | 10/2004 | Kane et al. | |
| 2005/0154572 A1 | 7/2005 | Sweeney, II | |
| 2005/0189679 A1 | 9/2005 | Kenison et al. | |
| 2005/0241548 A1 | 11/2005 | Muirhead | |
| 2006/0125642 A1 | 6/2006 | Chandaria | |
| 2006/0208072 A1 * | 9/2006 | Ku et al. | 235/383 |
| 2006/0212141 A1 | 9/2006 | Abraham, Jr. et al. | |
| 2006/0212164 A1 | 9/2006 | Abraham, Jr. et al. | |
| 2006/0243174 A1 | 11/2006 | Muirhead | |
| 2006/0290514 A1 | 12/2006 | Sakama et al. | |
| 2007/0032774 A1 | 2/2007 | Glade et al. | |
| 2007/0052521 A1 | 3/2007 | Beedles et al. | |
| 2007/0080805 A1 | 4/2007 | Franklin et al. | |
| 2007/0108296 A1 | 5/2007 | Konopka et al. | |
| 2007/0137531 A1 | 6/2007 | Muirhead | |
| 2007/0163472 A1 | 7/2007 | Muirhead | |
| 2007/0171080 A1 | 7/2007 | Muirhead | |
| 2007/0229284 A1 | 10/2007 | Svalesen et al. | |
| 2008/0036827 A1 | 2/2008 | Anderson et al. | |
| 2008/0094223 A1 | 4/2008 | Svalesen et al. | |
| 2008/0121339 A1 | 5/2008 | Muirhead | |
| 2008/0122610 A1 | 5/2008 | Muirhead | |
| 2008/0129460 A1 | 6/2008 | Abraham | |
| 2008/0129461 A1 | 6/2008 | Abraham | |
| 2008/0143221 A1 | 6/2008 | Svalesen | |
| 2008/0191001 A1 | 8/2008 | Chandaria | |
| 2008/0218356 A1 | 9/2008 | Frew et al. | |
| 2009/0015409 A1 | 1/2009 | Cheung et al. | |
| 2009/0224923 A1 | 9/2009 | Abraham, Jr. et al. | |
| 2011/0309591 A1 * | 12/2011 | Petrick et al. | 280/47.35 |

OTHER PUBLICATIONS

"Whitepaper: EPCglobal Class 1 Gen 2 RFID Specification," 2005 (approved Dec. 2004), pp. 1-7, http://www.alientechnology.com/docs/AT_wp_EPCGlobal_WEB.pdf, Alien Technology Corporation, Morgan Hill, CA.

Harrell, J., "Orthogonal Aray Testing Strategy (OATS) Technique," 2001, retrieved on Jun. 24, 2010, Seilevel, Inc.

* cited by examiner

PORTABLE RADIO FREQUENCY IDENTIFICATION SYSTEM

This application claims the benefit of U.S. Provisional Application No. 61/109,444, entitled "Radio Frequency Identification ("RFID") Concepts," filed on Oct. 29, 2008, which application is incorporated herein by reference.

TECHNICAL FIELD

The present invention is directed, in general, to radio frequency identification ("RFID") systems and, in particular, to a portable RFID system and method of operating the same.

BACKGROUND

While the core technologies that support radio frequency identification ("RFID") systems have been around for some time, the applications that drive the use thereof have been slow to market. The aforementioned trend has been turning in an impressive fashion as the size and cost of RFID tags has decreased and the sensitivity of RFID readers has increased. Moreover, the market forces, especially with respect to the supply chain in the retail industry, are pulling the RFID technologies into the mainstream and literally onto the shelves.

The RFID tags are used in several logistics and supply chain applications to track and monitor objects such as products and assets through various points in the supply chain. Certain assets are reusable, and it is common to use RFID tags that serve as permanent "license plates" or unique identifiers. The permanent license plate RFID tags save the asset owners money by not requiring a one-way, disposable RFID tag, but those skilled in the art of logistics and transportation understand that this is not limited to only permanent RFID tags on assets. It would be beneficial to implement a system applicable with permanent RFID license plates, one-way RFID tags, or both where the situation applies.

Presently, RFID systems for the tracking of assets are limited in their ability to be fine tuned and optimized for a particular environment or application. Usually integrators utilize the "one size fits all" solution meaning the tools are limited to the customer for a true optimization of an RFID pilot. There are a number of challenges presented when deciding on a solution. For instance, the object for receiving the RFID tag may lack usable area to install the RFID tag to track assets. There may also be limited access to electrical and Ethernet connectivity for the RFID system.

Additionally, customers may have limited budgets and may want the flexibility to track assets at various locations without committing to RFID readers at multiple locations. In other words, the customers may wish to utilize one RFID reader employable at a number of locations. The customers also prefer the ability to prevent unwanted assets with the RFID tags from being read.

Of course, the applications for RFID systems vary as well. A particular application may dictate a food grade area wherein the RFID system should be sealed to prevent an incidental matter or dust from entering the same. A particular application may dictate directionality from antenna lobes of the RFID system to prevent radio frequency ("RF") from reading a certain area. Some applications may limit the length of time that the RFID system is used on a daily basis. In these extreme instances, a portable RFID system with the ability to be tailored for an application is beneficial to the customer, thereby conforming to the requirements of the application for enhanced performance.

As mentioned above, RFID systems may be employed to track different types of assets. For instance, tape reels are held in a number of holding areas. It is very difficult to determine the quantity of each component as well as the location where each reel is stored. Typically, the only time that each reel is read is with a barcode reader or if the part number is keyed by hand. RFID systems are considered a solution, but present a number of challenges.

Due to the problems associated with electrostatic discharge ("ESD"), most reels associated with pick and place activities are conductive and metallic in nature. This provides an undesirable environment when trying to read RFID tags on these materials. Conductive materials prevent the RFID tags from being read on or through the reel. Most components within the reel are metallic, which also prevents an RFID tag from being read on or through the reel. These challenges along with the fact that the reels are of various diameters make it difficult to apply an RFID tag directly on a reel. As an example, different sized reels placed side-by-side in an area make it difficult to apply an RFID tag in a location accessible to the RFID reader, especially when the RFID system comes in a one size fits all configuration.

Thus, what is needed in the art is a portable RFID system that can incorporate a modular antenna design for a particular RFID application that allows multiple antenna configurations to fit a desired application. Additionally, it would be beneficial to have an RFID tag holder for assets such as tape reels that enables the RFID tags to be read substantially without interference from conductive materials or from metal of the taped passive components.

SUMMARY OF THE INVENTION

These and other problems are generally solved or circumvented, and technical advantages are generally achieved, by advantageous embodiments of the present invention that include a radio frequency identification ("RFID") system and method of operating the same. In one embodiment, the RFID system includes a portable structure including a frame with a base supported by a plurality of wheels, an antenna tower and at least one removable shelf therein. The RFID system also includes an RFID reader located on the at least one removable shelf and at least one antenna mounted on the antenna tower and coupled to the RFID reader. The RFID system still further includes a computer system located on the at least one removable shelf and coupled to the RFID reader, and a power subsystem located on the at least one removable shelf and coupled to the RFID reader and the computer system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
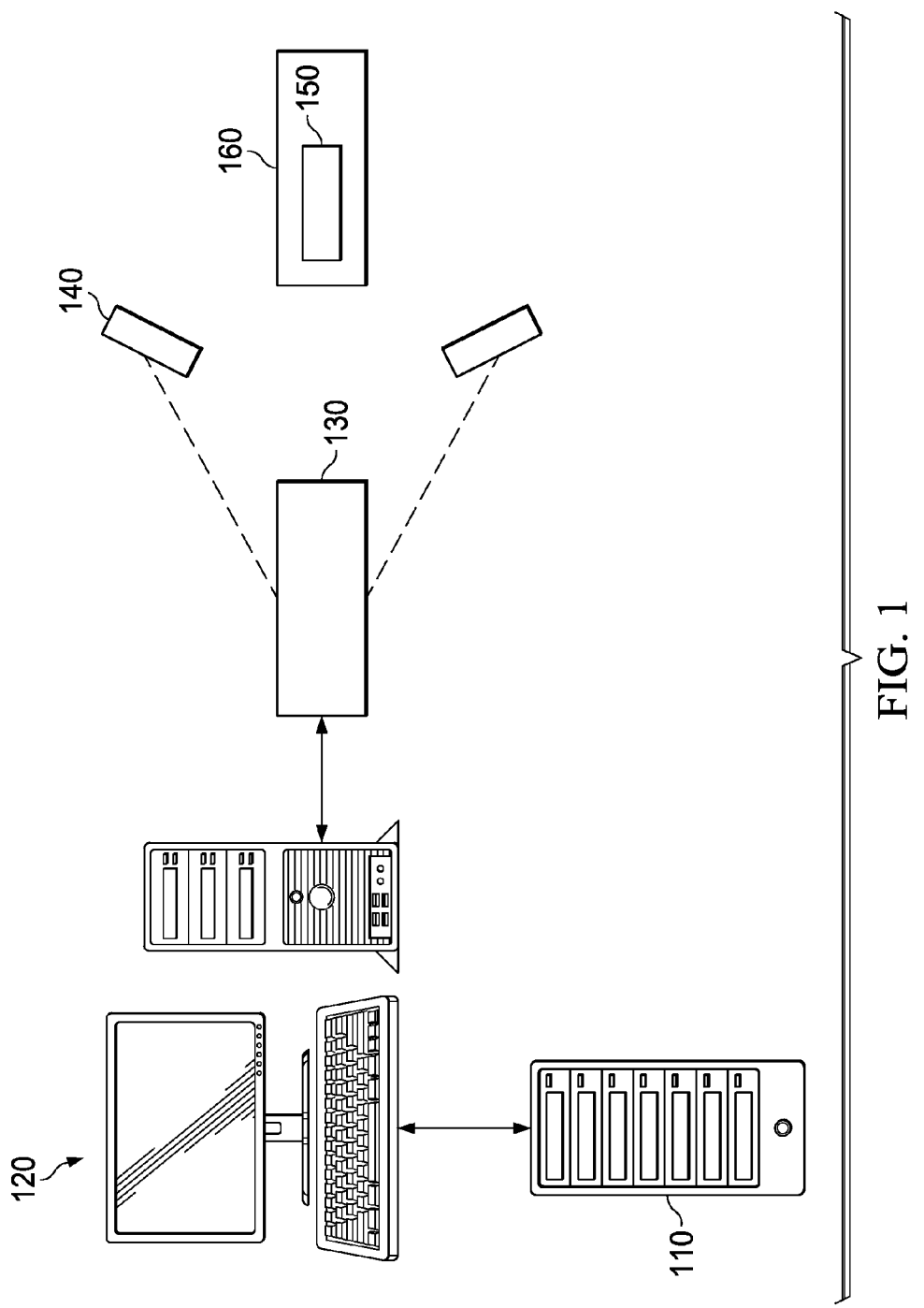
FIG. 1 illustrates a system level diagram of an embodiment of an RFID system constructed according to the principles of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Unless otherwise provided, like designators for devices employed in different embodiments illustrated and described herein do not necessarily mean that the similarly designated devices are constructed in the same manner or operate in the same way. The present invention will be described with respect to an exemplary embodiment in a specific context, namely, an RFID system incorporating techniques to transmit information between an RFID tag and an RFID reader. The RFID system is employable in any application and is particularly useful when applied to applications wherein efficient transfer of information between the RFID tag and RFID reader would be beneficial. While the exemplary embodiments are described with respect to an RFID system that places and locates RFID tags on selected objects, those skilled in the art should understand that the principles of the present invention are applicable to any application for the RFID system.

With the vast variety of assets used in logistics and transportation, there are several materials upon which RFID tags may be attached or embedded. Not only may the asset materials provide challenges for attachment or embedment, they can also negatively impact RFID read performance post-attachment/post-embedment.

The RFID tagging of the assets is a relatively new application of RFID technology, so there is a need to tag existing assets in circulation as well as newly manufactured assets, potentially inline with the manufacturing process. As the assets suffer abuse due to handling, transportation, and/or the operating environment, there could also be a need to tag the assets in such a way that the RFID tag is protected. The RFID tag could be encapsulated prior to being attached to the object. Additionally, a location of the RFID tag with respect to the object should enhance a readability thereof with an RFID reader of the RFID system.

The RFID system as described herein provides a method for solving the tag attachment or embedment options. The options may include mechanical attachment such as screws and/or rivets, adhesion methods, or embedment options wherein the RFID tag is actually placed inside the asset during the original manufacturing process or during a post manufacturing process. Those skilled in the art should understand that these methods are different to protect the function of the asset as well as the RFID tag, which is not available for labels such as human readable or barcode labels.

Additionally, the RFID system may employ rules to process information to be transmitted between the RFID tag and RFID reader. A processor may reside within an integrated circuit of the RFID tag in the form of firmware to process information. As a result, the RFID tag is "smarter" than just a data logging device, and when the RFID tag is interrogated, it may provide the processed data versus a full memory download or the raw data to a host application, thereby requiring less time than the alternative of a full download. Of course, the full download of the RFID tag's payload would still be possible.

Referring initially to FIG. 1, illustrated is a system level diagram of an embodiment of an RFID system constructed according to the principles of the present invention. The RFID system includes a server 110, a computer system 120, and an RFID reader 130 with antennas (one of which is designated 140). The computer system 120 (in connection with the server 110) directs the RFID reader 130 to read RFID tag(s) 150 located on a product or host material 160. While a single product 160 is illustrated herein, those skilled in the art should understand that the product 160 conceptually may also represent multiple products. In addition, the communication links between respective systems in the RFID system may be wired or wireless communication paths to facilitate the transmission of information therebetween. For a better understanding of communication theory, see the following references "Introduction to Spread Spectrum Communications," by Roger L. Peterson, et al., Prentice Hall, Inc. (1995), "Modern Communications and Spread Spectrum," by George R. Cooper, et al., McGraw-Hill Books, Inc. (1986), "An Introduction to Statistical Communication Theory," by John B. Thomas, published by John Wiley & Sons, Ltd. (1995), "Wireless Communications, Principles and Practice," by Theodore S. Rappaport, published by Prentice Hall, Inc. (1996), "The Comprehensive Guide to Wireless Technologies," by Lawrence Harte, et al., published by APDG Publishing (1998), "Introduction to Wireless Local Loop," by William Webb, published by Artech Home Publishers (1998), and "The Mobile Communications Handbook," by Jerry D. Gibson, published by CRC Press in cooperation with IEEE Press (1996), all of which are incorporated herein by reference.

Figure 2:
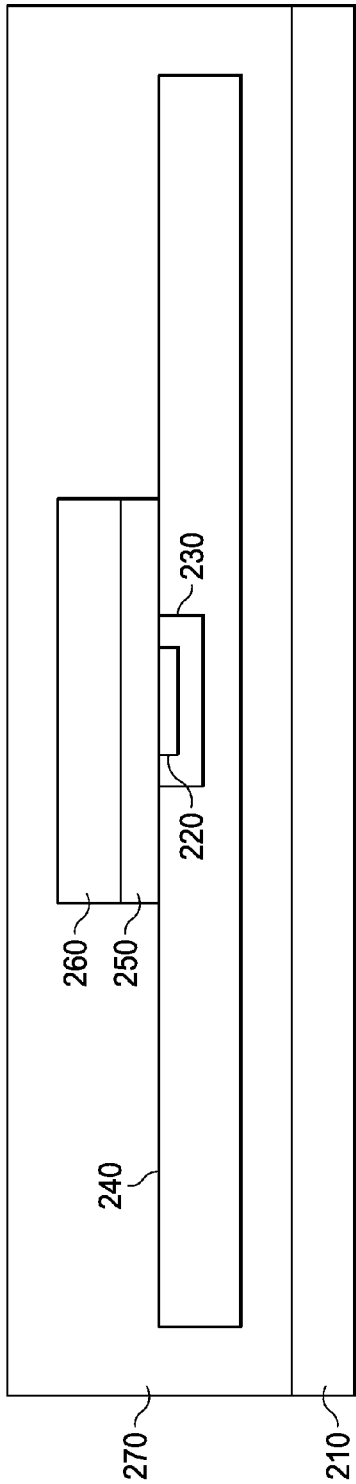
FIG. 2 illustrates a block diagram of an embodiment of an RFID tag constructed according to the principles of the present invention.
Figure 3:
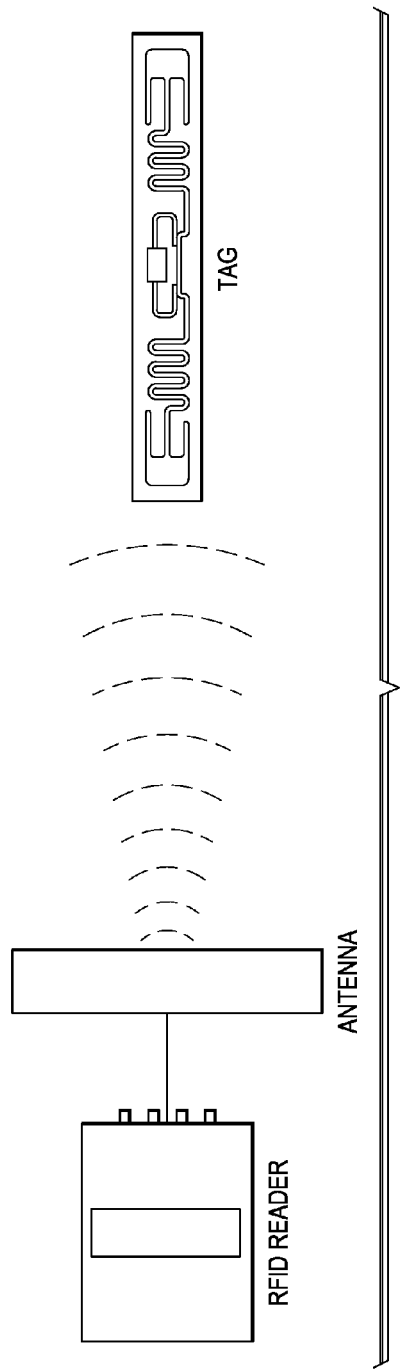
FIGS. 3 to 6 illustrate diagrams demonstrating exemplary principles of RFID systems in accordance with the principles of the present invention.

Turning now to FIG. 2, illustrated is a block diagram of an embodiment of an RFID tag constructed according to the principles of the present invention. The RFID tag is affixed or applied to a host material (e.g., a host material including a metal surface or a metal object) 210 and includes an integrated circuit 220 (including memory and a processor) located or embodied in a carrier 230 coupled to an antenna 240. An adhesive 250 is coupled to (e.g., located above and proximate) the carrier 230 and a strain relief member 260 is located above and proximate (e.g., bonded) to the adhesive 250. More particularly, the strain relief member 260 is coupled to the adhesive 250 on a surface opposite the integrated circuit 220 and the carrier 230. In the illustrated embodiment, the adhesive 250 and the strain relief member 260 cover a surface area of the integrated circuit 220 and the carrier 230. The strain relief member 260 provides strain relief for the integrated circuit 220 when the RFID tag is subject to mechanical stress such as compressive or expansive forces. Additionally, the strain relief member 260 may be formed from a temperature resistive material (e.g., a heat resistive material). The RFID tag is encapsulated by an encapsulant 270, which is coupled to and provides an offset for the RFID tag in relation to the host material 210.

As an example, consider the use of ultra high frequency ("UHF") RFID readers and tags, which typically have an approximate read range of 5 to 10 meters. Of course, the broad scope of the present invention contemplates all types of radio frequency tags as well as general improvements in RFID tag design and detection. All of the different RFID readers may have different read ranges (lobe sizes), but the RFID system described herein may be applied to any type of RFID reader and tag.

Figure 4:
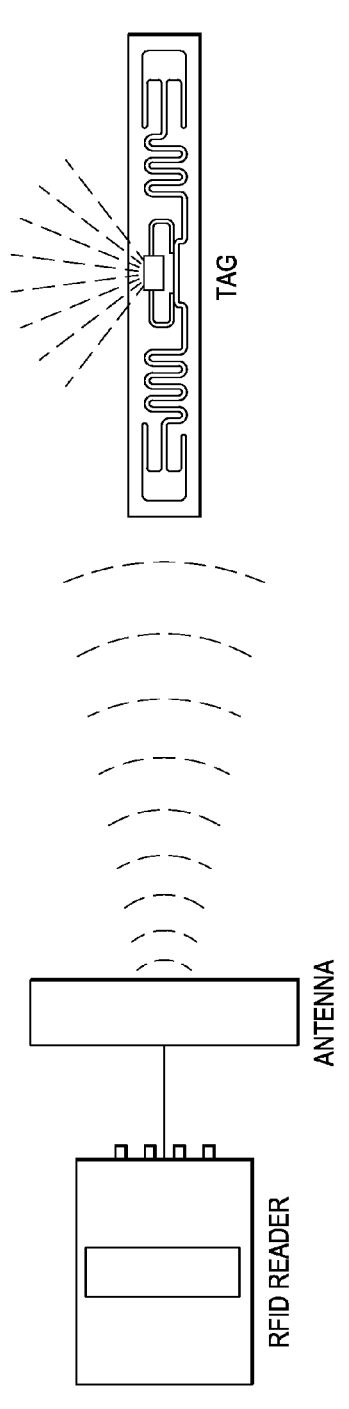
Figure 5:
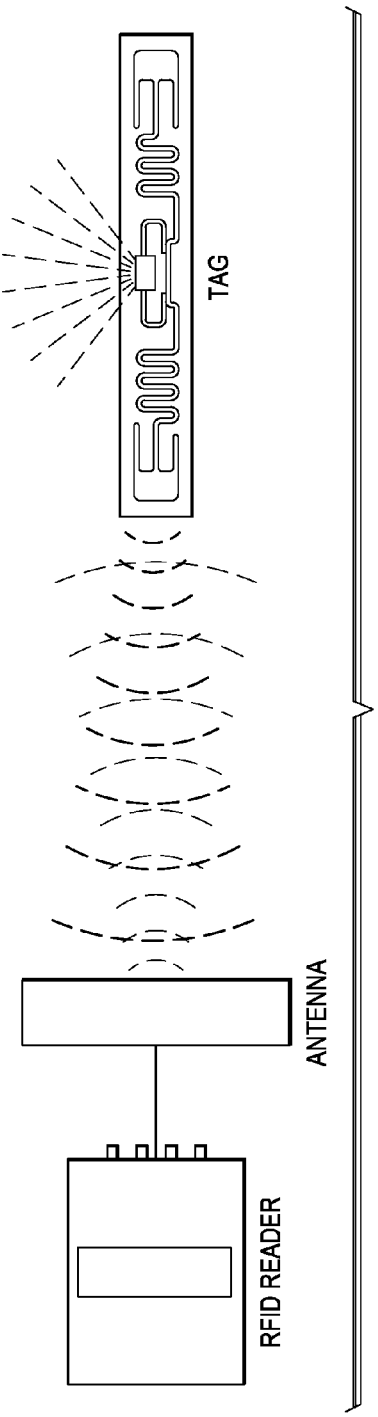

Turning now to FIGS. 3 to 6, illustrated are diagrams demonstrating exemplary principles of RFID systems in accordance with the principles of the present invention. The basic principle of RFID readers and tags is detecting a signal that is transmitted by an active RFID tag, or returned or reflected by a semi-active or passive RFID tag. When the RFID tag "response" occurs in the lobe of an RFID reader, the RFID tag is said to have been "read" by the reader. Oftentimes, the RFID reader may initiate or interrogate the lobe by transmitting a carrier signal to "see" if there are RFID tags present (via the RFID tag responses). The RFID reader interrogates the lobe for RFID tags (FIG. 3) and the RFID tag modulates the carrier signal from the RFID reader (FIG. 4). The RFID tag then responds by returning the modulated carrier signal (FIG. 5).

Figure 6:
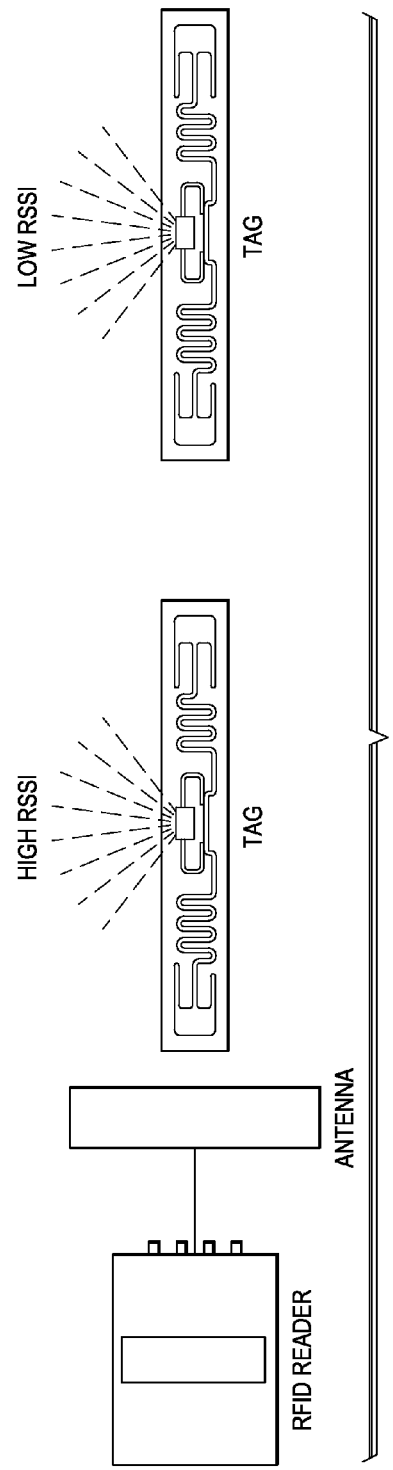

The energy with which the RFID tag responds is finite, and many RFID readers may indicate a delta index such as the received signal strength indication ("RSSI") in some form or another. This may be displayed as RSSI, reads per second, time differential of arrival ("TDOA"), or any other indication, but all are indices of signal strength or distance indication of the RFID tag from the RFID reader/antenna. The higher the RSSI, the stronger the RFID tag response is, which implies that it is closer to the RFID reader and antenna than a low RSSI value as illustrated in FIG. 6. Of course, it should be understood that a very sensitive RFID tag may respond with a higher RSSI, notwithstanding the distance from the RFID reader. In TDOA applications, a greater time differential of arrival of the received signal versus the departure of the transmit signal indicates a greater distance between the RFID tag and the RFID reader and antenna.

In the event that the particular RFID reader does not have, for instance, an RSSI indicator/feedback, one can be added to measure the RSSI on behalf of the RFID reader. This does not impact the functionality as described herein as the RSSI can be obtained from an RFID reader or from a readily available RSSI measurement device attached to the RFID reader. The above embodiment described with respect to FIGS. 3 to 6 are examples of passive RFID reader and tag systems, but those skilled in the art comprehend that the same principles apply to active and semi-active RFID systems and are not limited to passive RFID systems.

Figure 7:
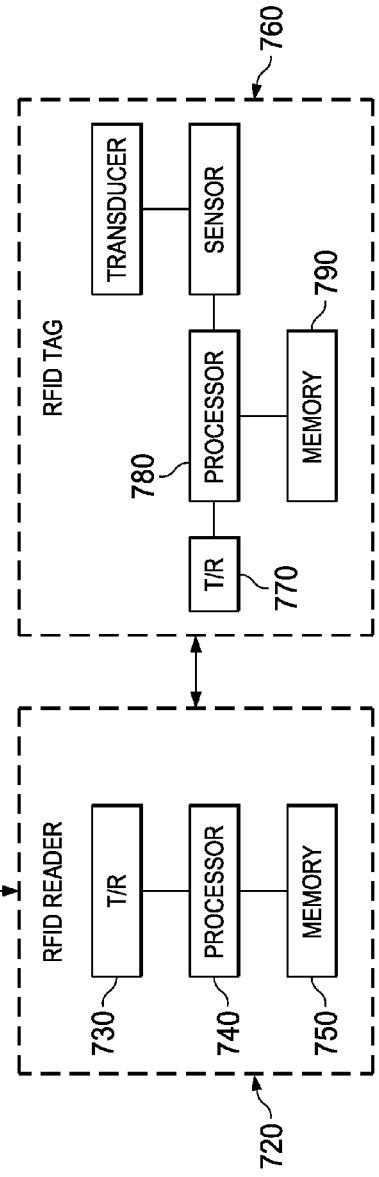
FIG. 7 illustrates a block diagram of an embodiment of an RFID reader in communication with an RFID tag according to the principles of the present invention.

Turning now to FIG. 7, illustrated is a block diagram of an embodiment of an RFID reader in communication with an RFID tag according to the principles of the present invention. A computer system 710 directs the RFID reader 720 to read RFID tag(s) 760 located on an object such as a product. A transmitter/receiver 730 of the RFID reader 720 transmits a carrier signal to the RIFD tag 760 and detects a signal representing the RFID tag 760 from a transmitter/receiver 770 thereof. A processor 740 of the RFID reader 720 processes the signal representing the RFID tag 760 and determines the presence of the RFID tag 760. The processor 740 of the RFID reader 720 can also compare a delta index from the signal to a threshold to determine when the RFID tag 760 is moving. A memory 750 of the RFID reader 720 stores instructions for the processor 740 and results processed thereby. In an analogous fashion, the transmitter/receiver 770 of the RFID tag 760 receives the carrier signal from the RFID reader 720, processes the carrier signal with a processor 780, and provides a signal (e.g., a returned, modulated carrier signal) from the RFID tag 760 via the transmitter/receiver 770 to the RFID reader 720. A memory 790 of the RFID tag 760 stores or includes information such as instructions, RFID tag identification, a parameter profile of the product, and results in the form of processed data and otherwise. While there are many forms of object tagging that may occur under the teachings herein, a few detailed examples are provided herein.

Figure 8:
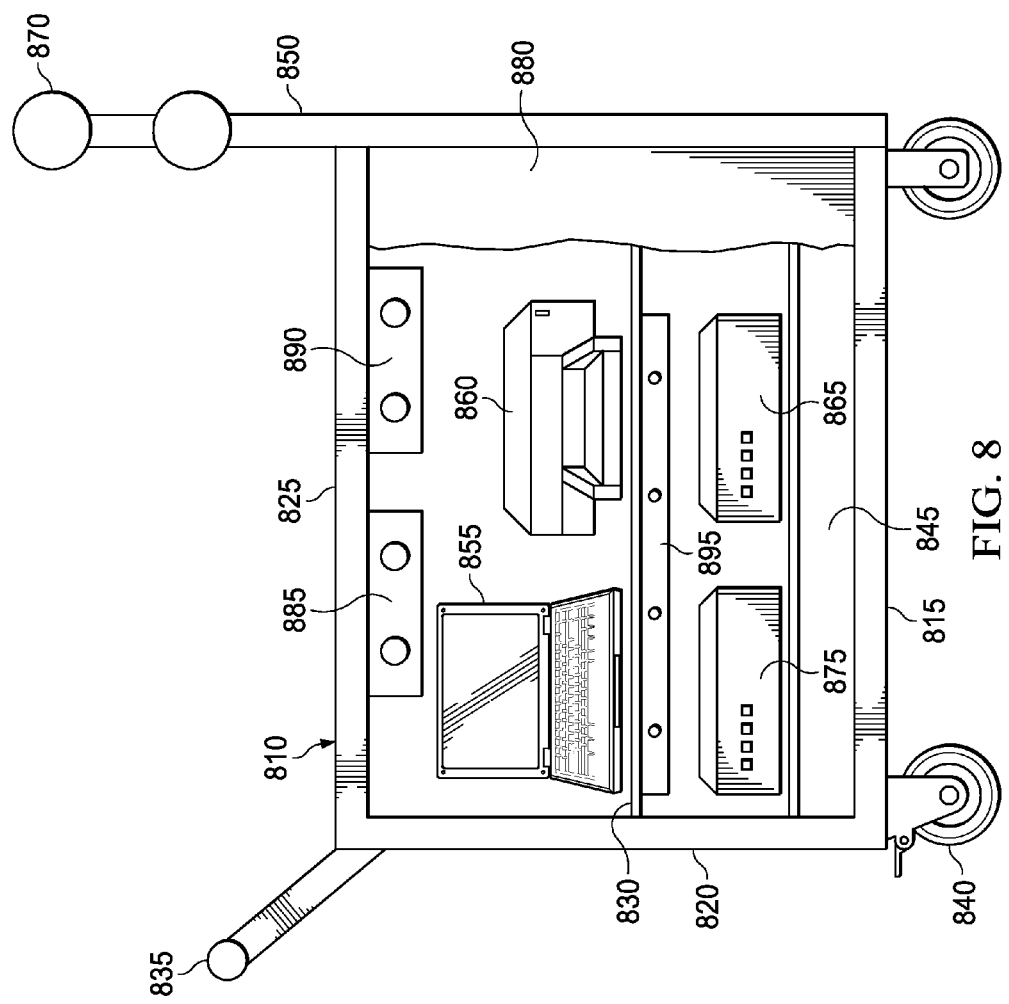
FIG. 8 illustrates a system level diagram of an embodiment of a portable RFID system constructed according to the principles of the present invention.

Turning now to FIG. 8, illustrated is a system level diagram of an embodiment of a portable RFID system constructed according to the principles of the present invention. The RFID system includes a portable structure (e.g., cart 810) with a frame having a base 815, sides (generally designated 820) and top 825. The cart 810 includes a plurality of removable shelves (one of which is designated 830) to accommodate subsystems of the RFID system. To provide easy installation, a plurality of removable shelves 830 located in channels of the frame can be employed to provide ample room for the subsystems of the RFID system. If additional service from the cart 810 is necessary, upgraded hardware can be integrated into the cart 810, as necessary. The cart 810 also includes a handle 835 coupled to a side thereof and a plurality of wheels (one of which is designated 840) to facilitate the mobility of the RFID system. The base 815 is supported by the plurality of wheels 840. A storage compartment 845 of the cart 810 can store peripheral components, spare parts and the like for the RFID system. An antenna tower 850 of the cart 810 is adjustable to accommodate different antenna configurations for the RFID system.

Within or about the cart 810 is a computer system embodied in a personal computer (with a display) 855 and printer 860, an RFID reader 865 coupled to a plurality of antennas (one of which is designated 870 mounted on the antenna tower 850) and a power subsystem 875 that provides power to the RFID system. The personal computer 855 controls the RFID reader 865 to scan for or read RFID objects (e.g., objects with an RFID tag) and can display of print the results therefrom. The personal computer 855 can also provide connectivity to an external computer system for supply chain management and the like. The RFID system may also be protected from the environment by a plurality of removable external panels (shown as a cutaway designated 880) about the sides 820 of the cart 810. A plurality of status indicator lights (generally designated 885, coupled to the frame of the cart 810) provide an operational status of subsystems of the RFID system. Additionally, a plurality of external interfaces (generally designated 890, coupled to the frame of the cart 810) provide external electrical and communications connectivity for the subsystems of the RFID system. The subsystems of the RFID system within the cart 810 are coupled (or connected) together via an internal bus and electrical interfaces (generally designated 895, coupled to the frame of the cart 810).

The RFID system also includes a movement assessment subsystem that provides a speed of the movement of the RFID system as the cart 810 moves from one location to another. Assuming that the RFID system is tracking RFID objects moving along a conveyer belt, the movement assessment subsystem can provide a speed of the movement of the cart 810 to match the speed of the conveyer belt to allow the RFID reader 865 via the antenna 870 to provide an enhanced scan of the RFID objects moving along the conveyer belt. Of course, the movement assessment subsystem can provide other advantages for the RFID system as well. In an exemplary embodiment, the movement assessment subsystem includes a sensor 896 coupled to the personal computer 855 proximate one of the plurality of wheels 840 that senses a magnet 897 located thereon. As the magnet 897 passes the sensor 896, the sensor 896 provides a signal to the personal computer 855 that computes the speed of the movement of the cart 810 and provides an indication thereof via a speed monitor 898 located on the handle 835 of the cart 810. As a result, a user can more accurately control the speed of the movement of the RFID system as the cart 810 moves from one location to another (e.g., along a conveyer belt with RFID objects).

Figure 9:
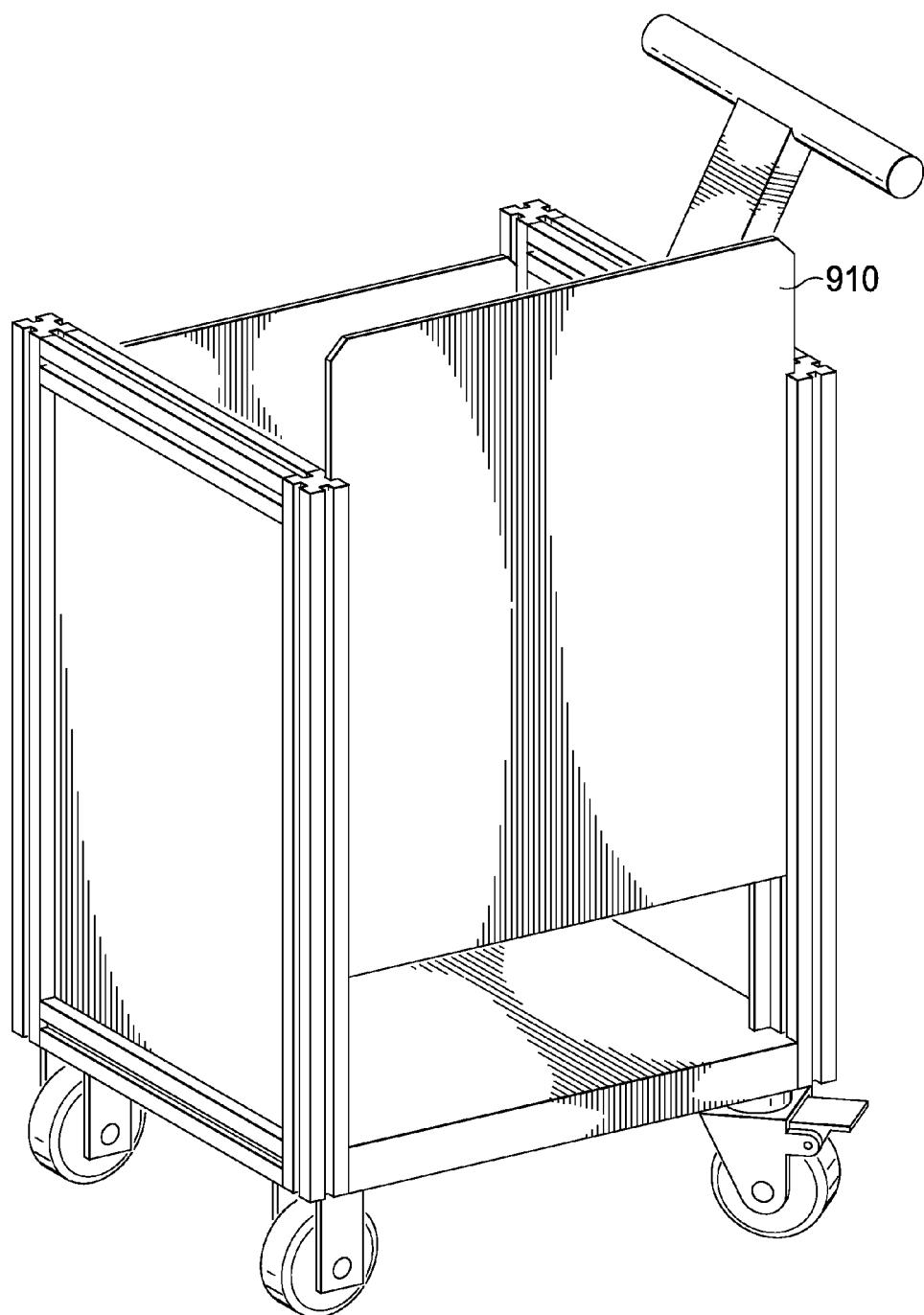
FIGS. 9 to 13 illustrate different views of embodiments of portable RFID systems constructed according to the principles of the present invention.
Figure 10:
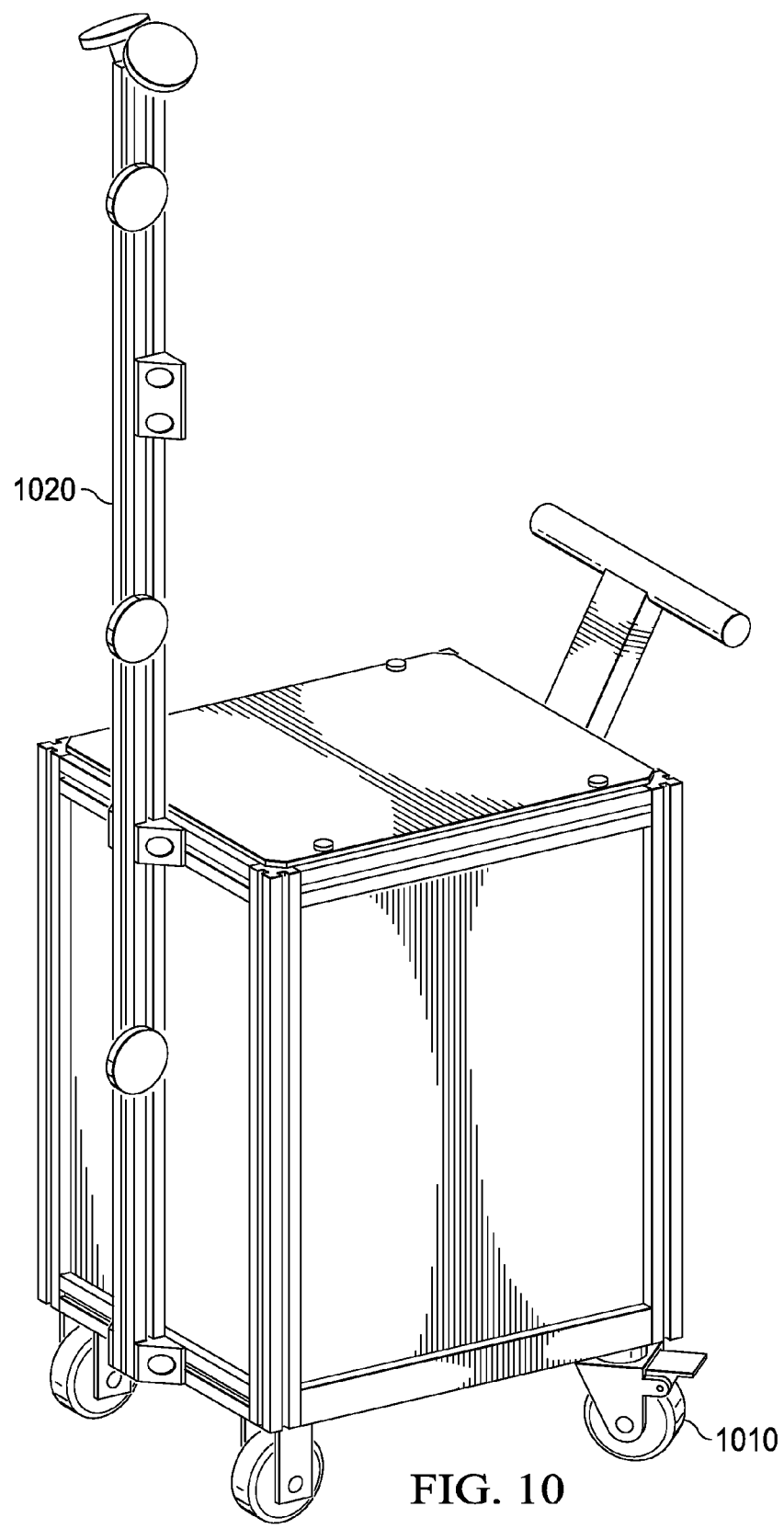
Figure 11:
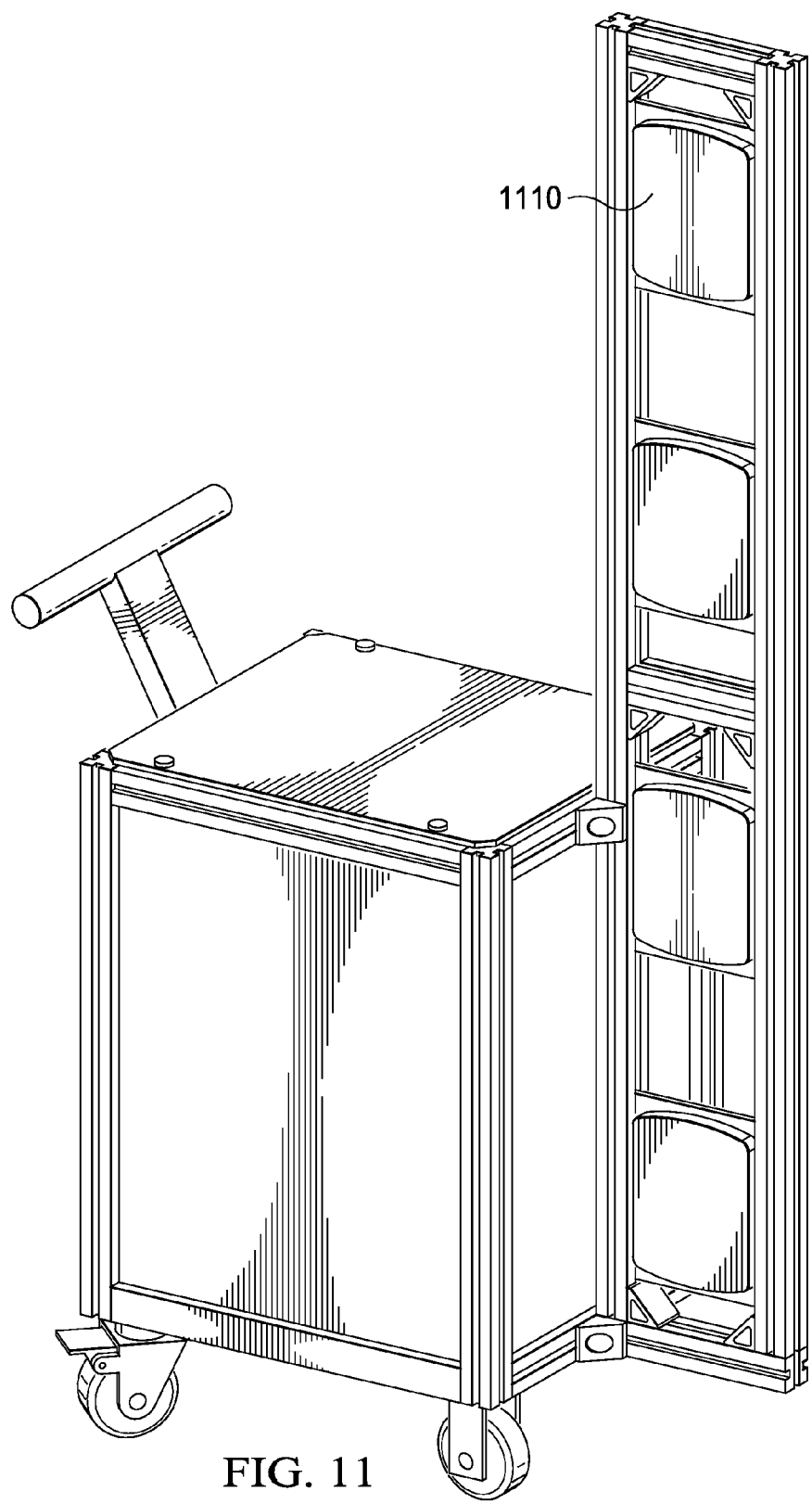
Figure 12:
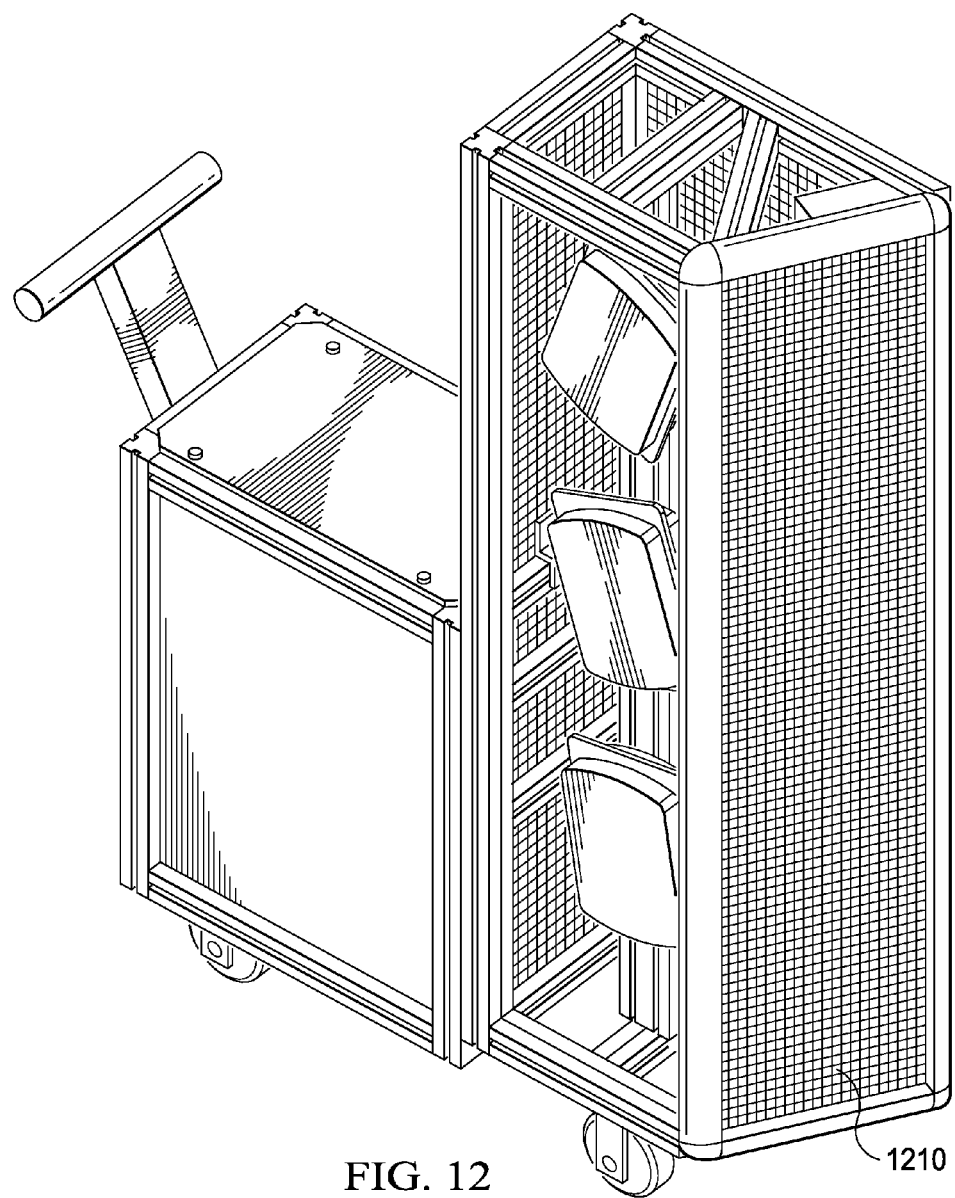
Figure 13:
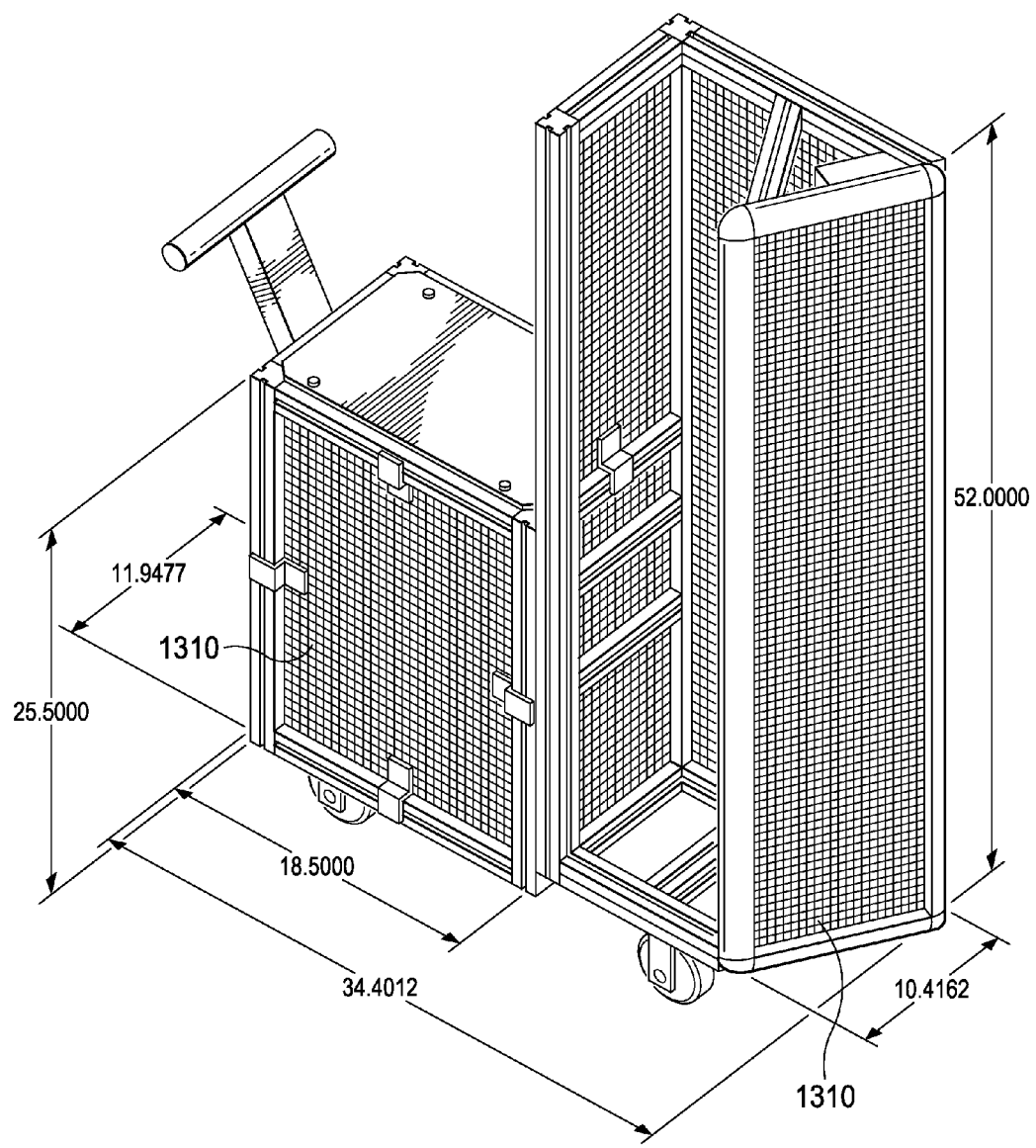

Referring now to FIGS. 9 to 13 and with continuing reference to FIG. 8, illustrated are different views of embodiments of portable RFID systems constructed according to the principles of the present invention. The different views demonstrate exemplary features of the RFID system that lend to the flexibility thereof to accommodate various applications. As illustrated in FIG. 9, removable external panels 910 can be installed to conform to clean room or incidental food exposure as well as mesh panels (designated 1310 in FIG. 13) to provide additional visibility and airflow. As illustrated in FIG. 10, locking swivel wheels 1010 are located in the rear of the base of the cart to provide a tight turning radius therefor. The front of the cart can be fitted with a multitude of antenna configurations to address a particular application. A single pedestal configuration 1020 can be used when smaller antennas need to be used (see FIG. 10). A framed array 1110 can be used when larger antennas need to be used for more challenging applications (see FIG. 11). As illustrated in FIGS. 12 and 13, if the need arises to prevent unwanted RFID tags from being read, a Faraday shield 1210, 1320 can be added or coupled to an antenna tower to enhance performance. Additionally, exemplary dimensions for the cart are designated in FIG. 13.

With continuing reference to the foregoing embodiments, the cart may be constructed of an aluminum extrusion frame mounted on four rubber wheels. The frame of the cart may incorporate two sections. The innermost section supports the RFID system to run the application and the outer or external panels serve as a way to protect the RFID subsystems within the cart from environment conditions. The antenna array can be fixed to the front of the cart either by single pedestal to support small antennas or a larger frame mechanism to support larger antennas. The handle may be T-shaped to incorporate universal comfort as well as increasing control of the cart.

The cart may incorporate the following features to augment the usability thereof. The cart should be wide enough so as not to be inadvertently tipped over. The cart should be made so that it can be easily maintained and repaired by simply lifting removable external panels. The cart should be of lightweight material so control by the operator can be easily maintained. The cart should be aesthetically pleasing to the customer. The cart should be sealed in such a way to limit access to RFID system or wires except by qualified personnel. The cart should be flexible enough to be easily configured to meet the requirements of an application.

Figure 14:
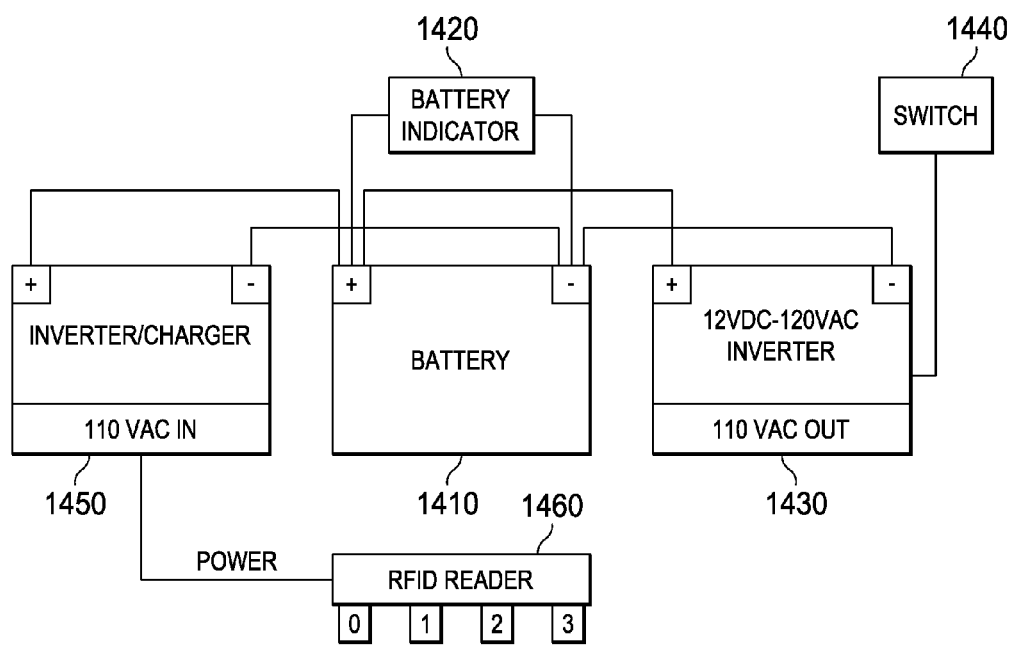
FIG. 14 illustrates a block diagram of an embodiment of a power subsystem of an RFID system constructed according to the principles of the present invention.

Turning now to FIG. 14, illustrated is a block diagram of an embodiment of a power subsystem of an RFID system constructed according to the principles of the present invention. The power subsystem includes a battery 1410 for storing energy to power the RFID system when the RFID system is not coupled to a source of electrical power. A battery indicator 1420 provides an indication of the charge remaining in the battery 1410. An inverter 1430 coupled to a switch 1440 converts the voltage (a DC voltage) from the battery 1410 to provide power to an RFID reader 1450 and other subsystems of the RFID system. An inverter/charger 1460 converts a voltage (e.g., 110 volts AC) from a source of electrical power to a DC charge voltage for the battery 1410. Thus, the power system can employ a battery 1410 to power the RFID system when the cart is not coupled to a source of electrical power or can otherwise power the RFID system directly from a source of electrical power.

Figure 15:
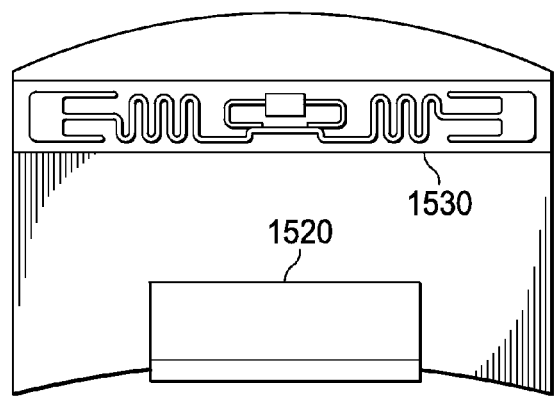
FIGS. 15 to 17 illustrate views of an embodiment of an RFID object constructed according to the principles of the present invention.
Figure 16:
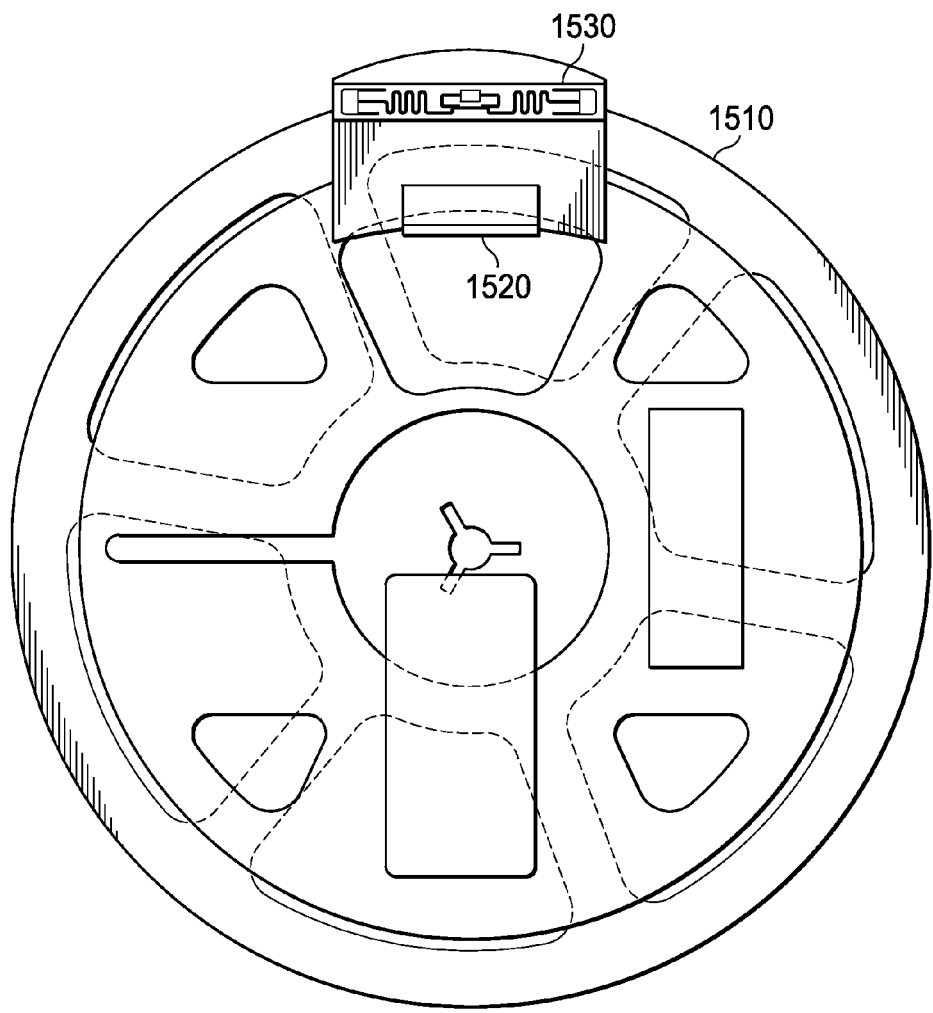
Figure 17:
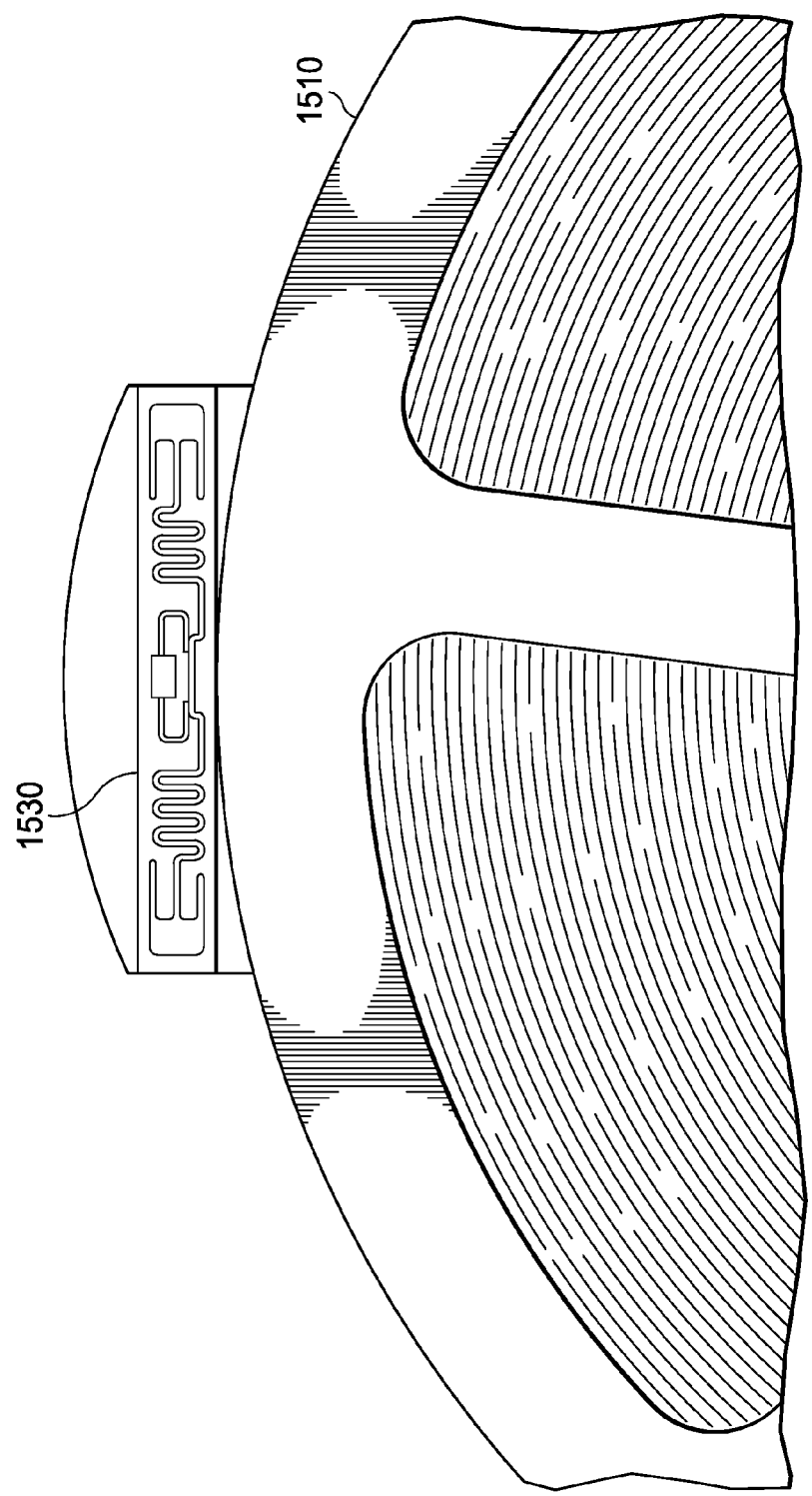

Turning now to FIGS. 15 to 17, illustrated are views of an embodiment of an RFID object (e.g., tape reel 1510 with an RFID tag 1530) constructed according to the principles of the present invention. The RFID tag 1530 may be located on a tape reel 1510 to track the same in holding areas reliably to determine a quantity and location of tape and reels in real time. A clip 1520 attached to an RFID tag 1530 protrudes outside the outermost profile of the tape reel 1510 so as to not have an opportunity for its readability to be degraded by an associated reel (due to its conductive properties) in parallel, or otherwise. The clip 1520 may be constructed of white polystyrene, which is rigid enough so that the clip 1520 should remain in the same position. A wet inlay can be applied to the RFID tag 1530 to decrease any risk of removal from the clip 1520.

The RFID object may include the following features. The clip 1520 should be a low cost material and easily extruded. Due to the variable sizes of the tape reel 1510 in inventory, the clip 1520 and RFID tag 1530 should be electrically visible to the antennas of an RFID reader to be consistently read by the same. The clip 1520 should be rigid and retain a profile for ease of reading. The RFID tag wet inlays should be easily applied and remain intact. The clip 1520 should be easily applied and removed by an operator or machine before and after a pick and place operation. The clip material should to be RFID friendly.

Thus, a portable RFID system and method of operating the same has been disclosed herein. In one embodiment, the RFID system includes a portable structure (e.g., a cart) including a frame with a base supported by a plurality of wheels (ones of which are locking swivel wheels), an antenna tower, at least one removable shelf therein, a handle coupled to a side of the frame and a plurality of removable external panels about sides thereof. The RFID system also includes an RFID reader located on one of the shelves and at least one antenna (mounted on the antenna tower) coupled to the RFID reader. A computer system of the RFID system controls the RFID reader and is located on one of the shelves. A power subsystem of the RFID system provides power to the RFID reader and the computer system and is also located on one of the shelves. The portable structure may also include a storage compartment therein. The antenna tower is adjustable to accommodate different antenna configurations such as a framed array of antennas. A Faraday shield may also be coupled to the antenna tower to shield the antennas from reading unwanted RFID objects. The RFID system may also include a plurality of status indicator lights coupled to the frame and configured to provide an operational status of the RFID reader and the computer system. A plurality of external interfaces (coupled to the frame) are configured to provide external electrical and communications connectivity for ones of the RFID reader, the computer system and the power subsystem. Additionally, an internal bus and electrical interfaces (coupled to the frame) are configured to provide internal connectivity between the RFID reader, the computer system and the power subsystem. The RFID system may also include a movement assessment subsystem to provide a speed of a movement thereof within the portable structure.

For a better understanding of RFID technologies, in general, see "RFID Handbook," by Klaus Finkenzeller, published by John Wiley & Sons, Ltd., 2nd edition (2003), which is incorporated herein by reference. For a better understanding of RFID tags in compliance with the EPC, see "Technical Report 860 MHz-930 MHz Class I Radio Frequency Identification Tag Radio Frequency & Logical Communication Interface Specification Candidate Recommendation," Version 1.0.1, November 2002, promulgated by the Auto-ID Center, Massachusetts Institute of Technology, 77 Massachusetts Avenue, Bldg 3-449, Cambridge, Mass. 02139-4307, which is incorporated herein by reference. For a better understanding of conventional RFID readers, see the following RFID readers, namely, "MP9320 UHF Range Long-Reader," provided by SAMSys Technologies, Inc. of Ontario, Canada, "MR-1824 Sentinel-Prox Medium Range Reader," by Applied Wireless ID of Monsey, N.Y. (see also U.S. Pat. No. 5,594,384 entitled "Enhanced Peak Detector," U.S. Pat. No. 6,377,176 entitled "Metal Compensated Radio Frequency Identification Reader," U.S. Pat. No. 6,307,517 entitled "Metal Compensated Radio Frequency Identification Reader"), "2100 UAP Reader," provided by Intermec Technologies Corporation of Everett, Washington and "ALR-9780 Reader," provided by Alien Technology Corporation of Morgan Hill, Calif., all of which are incorporated by reference.

Furthermore, for a better understanding of standards base work regarding RFID, see the EPCglobal standards and related publications, namely, EPCglobal release EPC Specification for Class 1 Gen 2 RFID Specification, December 2004, and a "Whitepaper: EPCglobal Class 1 Gen 2 RFID Specification," published by Alien Technology Corporation, Morgan Hill, Calif. (2005). For a better understanding of RFID devices, see U.S. Pat. No. 6,853,087, entitled "Component and Antennae Assembly in Radio Frequency Identification Devices," to Neuhaus, et al., issued Feb. 8, 2005. For related applications, see U.S. Patent Application Publication No. 2006/0212141, entitled "Radio Frequency Identification-Detect Ranking System and Method of Operating the Same," Abraham, Jr., et al., published Sep. 21, 2006, U.S. Patent Application Publication No. 2006/0212164, entitled "Radio Frequency Identification Application System," to Abraham, Jr., et al., published Sep. 21, 2006 (now U.S. Pat. No. 7,570,165, issued Aug. 4, 2009), U.S. Patent Application Publication No. 2007/0229284, entitled "Radio Frequency Identification Tag and Method of Forming the Same," to Svalesen, et al., published Oct. 4, 2007, U.S. Patent Application Publication No. 2008/0094223, entitled "Asset Including a Radio Frequency Identification Tag and Method of Forming the Same," to Svalesen, et al., published Apr. 24, 2008, U.S. Patent Application Publication No. 2008/0129460, entitled "Radio Frequency Identification Systems," to Abraham, published Jun. 5, 2008, U.S. Patent Application Publication No. 2008/0129461, entitled "Radio Frequency Identification Reader and Method of Operating the Same," to Abraham, published Jun. 5, 2008, U.S. Patent Application Publication No. 2008/0143221, entitled "Modular Reader Portal," to Svalesen, published Jun. 19, 2008, and U.S. Patent Application Publication No. 2008/0218356, entitled "Radio Frequency Identification Objects and Systems Employing the Same," to Frew, et al., published Sep. 11, 2008. The aforementioned references, and all references herein, are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the materials and structures discussed above can be implemented in different materials and structures to advantageously form an RFID system as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A radio frequency identification (RFID) system, comprising:
    a portable structure including a frame with a base supported by a plurality of wheels, an antenna tower and at least one removable shelf therein;
    an RFID reader located on said at least one removable shelf;
    at least one antenna mounted on said antenna tower and coupled to said RFID reader;
    a computer system located on said at least one removable shelf and coupled to said RFID reader; and
    a power subsystem located on said at least one removable shelf and coupled to said RFID reader and said computer system.

2. The RFID system as recited in claim 1 wherein said portable structure includes a handle coupled to a side thereof.

3. The RFID system as recited in claim 1 wherein said portable structure includes a storage compartment therein.

4. The RFID system as recited in claim 1 wherein said antenna tower is adjustable to accommodate different antenna configurations.

5. The RFID system as recited in claim 1 wherein said at least one antenna is a framed array of antennas mounted on said antenna tower.

6. The RFID system as recited in claim 1 further comprising a Faraday shield coupled to said antenna tower.

7. The RFID system as recited in claim 1 wherein said portable structure includes a plurality of removable external panels about sides thereof.

8. The RFID system as recited in claim 1 further comprising a plurality of status indicator lights coupled to said frame of said portable structure and configured to provide an operational status of said RFID reader and said computer system.

9. The RFID system as recited in claim 1 further comprising a plurality of external interfaces coupled to said frame of said portable structure and configured to provide external electrical and communications connectivity for ones of said RFID reader, said computer system and said power subsystem.

10. The RFID system as recited in claim 1 further comprising an internal bus and electrical interfaces coupled to said frame of said portable structure and configured to provide internal connectivity between said RFID reader, said computer system and said power subsystem.

11. The RFID system as recited in claim 1 wherein ones of said plurality of wheels are locking swivel wheels.

12. The RFID system as recited in claim 1 further comprising a movement assessment subsystem configured to provide a speed of a movement thereof within said portable structure.

13. A method of operating a radio frequency identification (RFID) system, comprising:
- providing a portable structure including a frame with a base supported by a plurality of wheels, an antenna tower and at least one removable shelf therein;
- scanning for RFID objects with an RFID reader located on said at least one removable shelf through at least one antenna mounted on said antenna tower;
- controlling said RFID reader with a computer system located on said at least one removable shelf; and
- powering said RFID reader and said computer system through a power subsystem located on said at least one removable shelf.

14. The method as recited in claim 13 further comprising adjusting said antenna tower to accommodate different antenna configurations.

15. The method as recited in claim 13 further comprising shielding said at least at least one antenna from unwanted RFID objects with a Faraday shield coupled to said antenna tower.

16. The method as recited in claim 13 further comprising protecting said RFID reader, said computer system and said power subsystem from environmental conditions with a plurality of removable external panels about sides of said frame of said portable structure.

17. The method as recited in claim 13 further comprising providing an operational status of said RFID reader and said computer system with a plurality of status indicator lights coupled to said frame of said portable structure.

18. The method as recited in claim 13 further comprising providing external electrical and communications connectivity for ones of said RFID reader, said computer system and said power subsystem through a plurality of external interfaces coupled to said frame of said portable structure.

19. The method as recited in claim 13 further comprising providing internal connectivity between said RFID reader, said computer system and said power subsystem through an internal bus and electrical interfaces coupled to said frame of said portable structure.

20. The method as recited in claim 13 further comprising assessing a speed of a movement of said RFID system within said portable structure.

* * * * *